July 15, 1958
H. E. GLODDE
2,842,833
DETREADING TOOL
Filed May 16, 1956
2 Sheets-Sheet 2
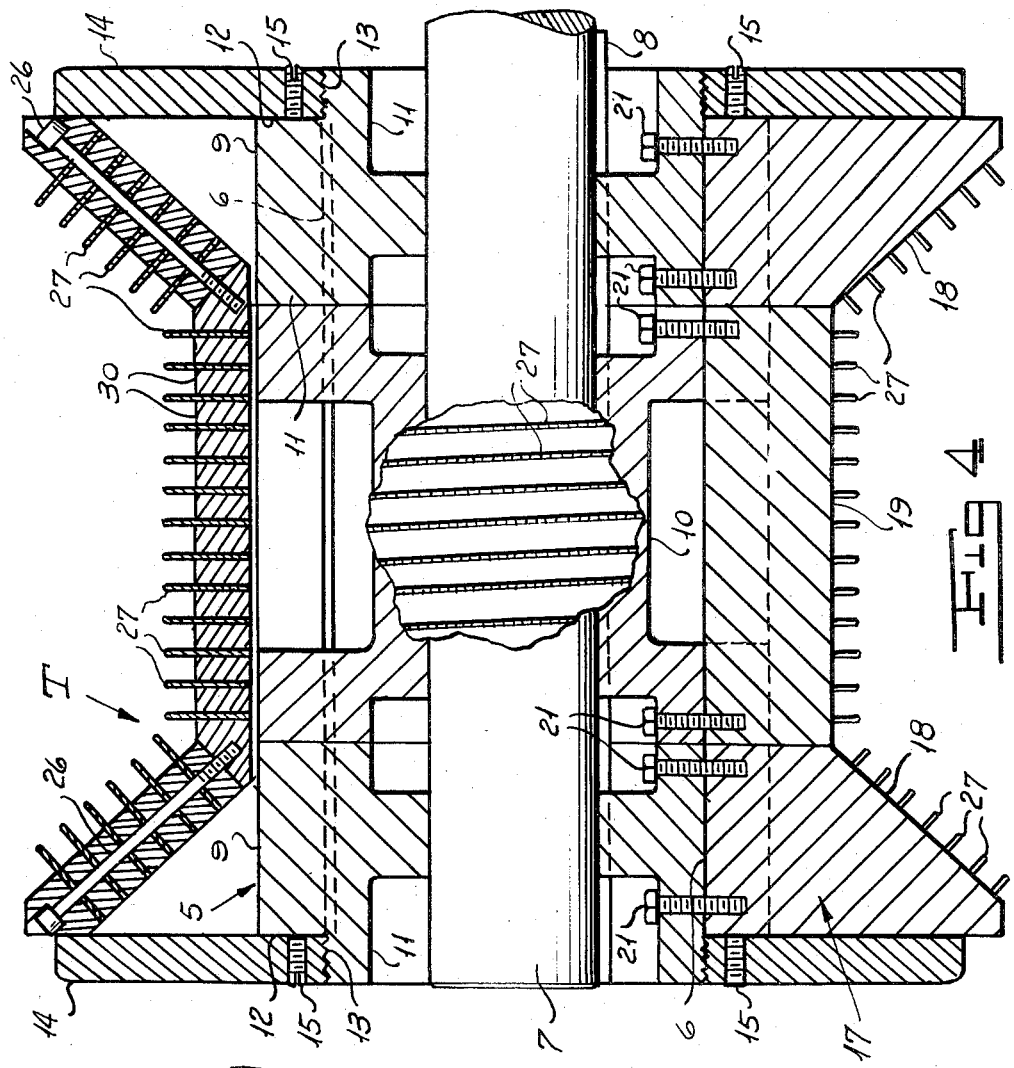
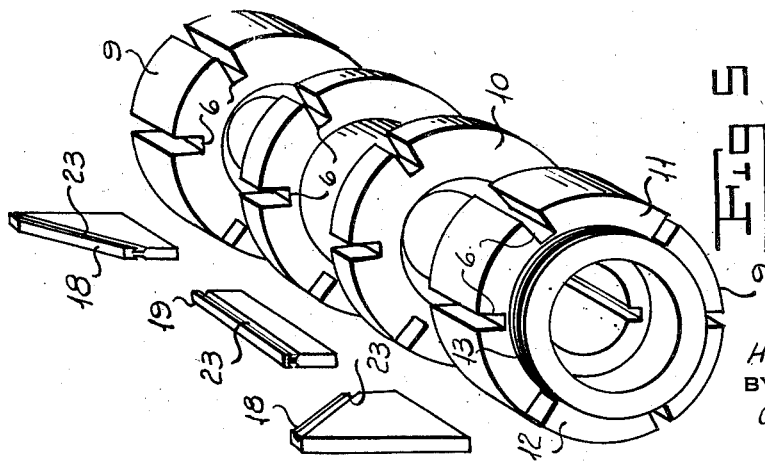
INVENTOR
*HERMAN E. GLODDE*
BY
*Robert F. Beck*
ATTORNEY

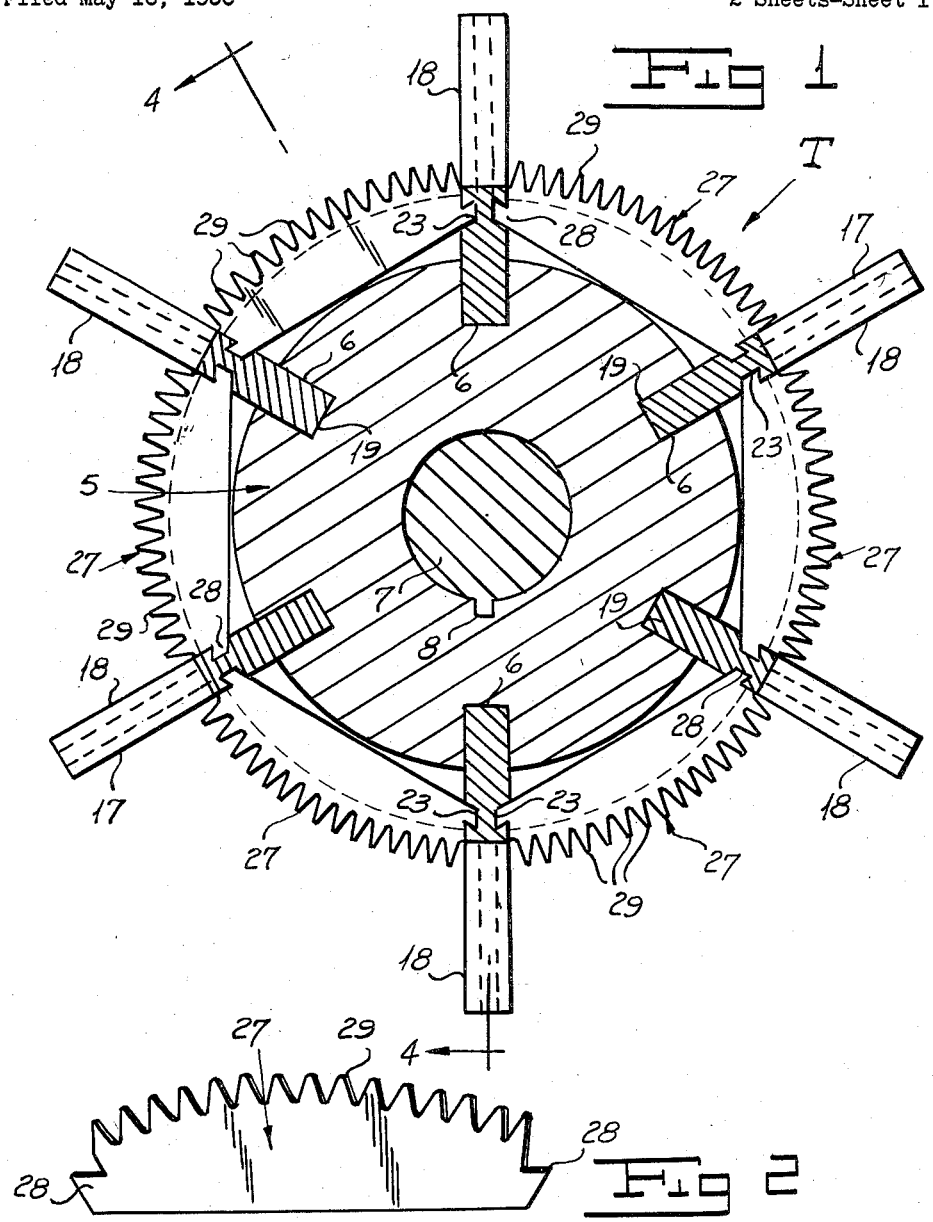

United States Patent Office 2,842,833
Patented July 15, 1958

2,842,833

DETREADING TOOL

Herman E. Glodde, Franklin Lakes, N. J.

Application May 16, 1956, Serial No. 585,200

3 Claims. (Cl. 29—79)

My invention relates to detreading tools for dressing tire casings preparatory to retreading.

One of the objects of my invention is to provide a detreading tool equipped with blades having teeth arranged in a manner to maximize the removal of the old tread of a tire casing during relative movement of the tire and tool.

Another object of my invention is to provide a tool of the foregoing described character wherein the blades are so arranged as to effect shaping of the casing to conform to a pre-established transverse contour.

A further object of my invention is to provide a tread removing tool equipped with shreading blades which may be readily replaced when the teeth thereof become worn.

Another object of my invention is to provide a tool of the foregoing described character which is simple in construction, durable in use, efficient in operation and economical in manufacture.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

Figure 1 is a transverse sectional view of a tool constructed in accordance with my invention.

Figure 2 is a perspective view of one of the blades.

Figure 3 is a perspective view of one of the spacers.

Figure 4 is a sectional view taken on the line 4—4 of Figure 1 with a portion of the tool being shown in elevation.

Figure 5 is a disassembled perspective view of the hub and a set of the blade holders.

My novel form of tire casing detreading or dressing tool T comprises, as illustrated in the drawings, an elongated cylindrical hub 5 formed on its peripheral face with spaced longitudinally extending slots 6 and with a bore accommodating therein a drive shaft adapted to be operated by a suitable power source. The hub 5 is fixed to the shaft 7 by a key 8 or other convenient fastening means whereby the hub is rotated in unison with the shaft. The hub 5 is fashioned with a pair of lengthwise disposed outer sections 9 and an intermediate section 10 with the sections being counterbored on their radial faces circumjacent the bore to provide circumferentially disposed flanges 11. The outer ends of the hub 5 are diametrically reduced to provide shoulders 12 while the outermost flanges of the sections 9, outwardly of the shoulders, are exteriorly threaded as at 13 and have threaded thereon nuts constituting retaining collars or rings 14. The rings 14 are normally disposed in abutting relation with the shoulders 12 and are maintained thereagainst by means of set screws 15.

Disposed within the slots 6 are blade holders 17 each comprising triangular shaped outer portions 18 and an oblong shaped intermediate portion 19 with the end portions 18 abutting the intermediate portion 19 as clearly illustrated in Figure 4 of the drawings. The flanges 11 have extending radially therethrough screws 21 threaded into the holders 17 whereby to coact with the rings 14 to retain the holders in fixed relation upon the hub with the screws 21 and rings 14 serving to preclude radial and lateral displacement, respectively, of the holders. If desired, bolts 26 may be employed to secure the blades and spacers on the outer portions 18 to the blades and spacers on the intermediate portion 19, of each holder 17.

The side faces of the holders 17, adjacent the hub 5, are formed with slots 23, the slots extending axially of the hub with respect to the portions 19 and in planes paralleling the hypotenuse of the portions 18 with respect to the latter, as clearly illustrated in Figure 5 of the drawings. Disposed between each pair of holders 17 is a group of blades 27 having end sections 28 seated within the confronting slots 23 of said pair, as clearly illustrated in Figure 1 of the drawings. The under faces of the blades 27, in proximity to the hub, are disposed in planes tangential to the hub while their outer faces are of an arcuate configuration, concentric with the hub, and formed with teeth 29. Spacers 30 are interposed between the blades 27 to maintain the latter in spaced relation and are formed with end sections 31 seated in the slots 23 in the same manner as the end sections of the blades, the blades of one group being arranged with respect to the blades of an adjacent group to position the teeth of one group in staggered relation with those of the adjacent group.

The blades 27 of each group are disposed in longitudinally aligned relation with each other and are canted relative to the axis of the hub, the angularity of the blades being such that the teeth of the blades of each group are staggered with relation to the teeth of the blades of the adjacent group to effect close tracking of the teeth during rotation of the tool, thus, eliminating relatively wide spacing between teeth of adjacent discs during rotation and the forming of circumferential mounds or ridges on a tire casing during detreading thereof by the tool. The shape of the holder is such as to position the blades in a manner that the teeth remove the tread from the casing to conform to a desired contour, it being understood that the length of the intermediate portions 19 is such as to accommodate tires of various transverse sizes within a limited range between the blades carried by the portions 18 and that the casing may be moved axially with respect to the tool to effect desired shaping and dressing of the casing and tread removal therefrom.

In operation, the tool T is mounted upon the shaft 7 and the latter rotated relative to a tire casing presented in engagement with the blades whereby the blades function to detread and shape the casing for retreading. The blades may be readily replaced by removing the hub 5 from shaft 7, the rings 14 from the hub, loosening the screws 21 from the holders, detaching the holders from the hub and the blades from the holders. When the blades have been replaced, the parts are reassembled in the reverse order.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined solely to the use herein disclosed in connection therewith as it may be utilized for any purpose to which it is adaptable. It is therefore to be understood that the invention is not limited to the specific construction as illustrated and described, as the same is only illustrative of the principles involved which are capable of extended application in various forms, and the invention comprehends all construction within the scope of the appended claims. The meaning of the term "detreading tool" shall be inclusive of a tool adapted for removing the tread from a tire casing and/or the shaping and dressing of the casing preparatory to retreading.

What I claim is:

1. A detreading tool for removing a tread from a tire casing, comprising a hub adapted to be secured to a drive shaft for rotation therewith and formed with axially extending slots spaced circumferentially around the hub, blade holders formed as flat plates disposed in said slots, each blade holder formed in the axial direction of a separate central oblong section and detachable trapezoidal end sections, the outer edges of said trapezoidal end sections diverging outwardly from the ends of the outer edge of said central section, groups of spaced elongated blades having outwardly extending teeth and disposed lengthwise in a circumferential direction around the hub between pairs of adjacent holders, means on the ends of said blades and on said holders for detachably securing said blades to said holders, the blades of each group extending at a slight angle to the normal to the axis of the hub, and detachable means holding said central and end holder sections in abutting relation.

2. A detreading tool for removing a tread from a tire casing, comprising a hub adapted to be secured to a drive shaft for rotation therewith and formed with axially extending slots spaced circumferentially around the hub, blade holders formed as flat plates disposed in said slots, each blade holder formed in the axial direction of a separate central oblong section and detachable trapezoidal end sections, the outer edges of said trapezoidal end sections diverging outwardly from the ends of the outer edge of said central section, groups of spaced elongated blades having outwardly extending teeth and disposed lengthwise in a circumferential direction around the hub between pairs of adjacent holders, said blades having reduced end projections engaging slots along said plate blade holders for detachably securing said blades to said holders, the blades of each group extending at a slight angle to the normal to the axis of the hub, and detachable means holding said central and end holder sections in abutting relation.

3. A detreading tool for removing a tread from a tire casing, comprising a hub adapted to be secured to a drive shaft for rotation therewith and formed with axially extending slots spaced circumferentially around the hub, blade holders formed as flat plates disposed in said slots, each blade holder formed in the axial direction of a separate central oblong section and detachable trapezoidal end sections, the outer edges of said trapezoidal end sections diverging outwardly from the ends of the outer edge of said central section, groups of spaced elongated blades having outwardly extending teeth and disposed lengthwise in a circumferential direction around the hub between pairs of adjacent holders, means on the ends of said blades and on said holders for detachably securing said blades to said holders, the blades of each group extending at a slight angle to the normal to the axis of the hub, detachable means holding said central and end holder sections in abutting relation, and retaining collars secured to the outer ends of said hub and engaging the outer end edges of said trapezoidal sections to hold the blade holder sections securely on said hub.

References Cited in the file of this patent

UNITED STATES PATENTS

| | | |
|---|---|---|
| 855,007 | Johnson | May 28, 1907 |
| 927,846 | Flett | July 13, 1909 |
| 1,379,146 | West et al. | May 24, 1921 |
| 1,395,309 | Taber | Nov. 1, 1921 |
| 1,957,792 | McManis | May 8, 1934 |
| 2,035,802 | George | Mar. 31, 1936 |
| 2,205,343 | Carelli | June 18, 1940 |
| 2,259,820 | James | Oct. 21, 1941 |
| 2,694,850 | Hagen | Nov. 23, 1954 |
| 2,703,446 | Jensen | Mar. 8, 1955 |
| 2,741,307 | Meserve | Apr. 10, 1956 |

FOREIGN PATENTS

| | | |
|---|---|---|
| 410,629 | Germany | Mar. 3, 1925 |
| 1,081,755 | France | June 9, 1954 |